United States Patent [19]

Smitherman

[11] 4,210,286
[45] Jul. 1, 1980

[54] POLE MOUNTED WEED KILLER DISPENSER

[76] Inventor: Ray C. Smitherman, 896 Old Brook Rd., Charlottesville, Va. 22901

[21] Appl. No.: 955,587

[22] Filed: Oct. 30, 1978

[51] Int. Cl.² .................. B05B 1/14; A01G 29/00
[52] U.S. Cl. ............................. 239/302; 47/24; 239/379; 239/557; 239/567
[58] Field of Search ............... 47/24; 239/302, 379, 239/557, 567

[56] References Cited

U.S. PATENT DOCUMENTS

| | | |
|---|---|---|
| 799 | 6/1838 | Dennis . |
| 29,730 | 8/1860 | Taylor . |
| 53,772 | 4/1866 | Beach . |
| 1,415,134 | 5/1922 | Williams . |
| 1,758,767 | 5/1930 | Taggart .................. 239/567 X |
| 2,217,557 | 10/1940 | MacFee . |
| 2,776,861 | 1/1957 | Swenson .................. 239/567 X |
| 3,185,397 | 5/1965 | Nelson . |
| 3,921,914 | 11/1975 | Hatt . |
| 4,000,971 | 1/1977 | Gaskins . |

*Primary Examiner*—Richard A. Schacher
*Attorney, Agent, or Firm*—Stevens, Davis, Miller & Mosher

[57] ABSTRACT

A liquid weed killer dispenser is disclosed. The dispenser is adapted to be mounted on and disposed about a pole such as a telephone or telegraph pole. The dispenser includes a box-like holder for water and a weed killer which is dispersible in the water. The holder has a recessed top which defines a rain water receiving perforated tray through which the rain water can flow into the holder. The top is readily removable from the holder. Weed killer containers, such as bags, are disposed in the holder. The containers are connected to the top so as to be removable with it from the holder and readily replaceable. The dispenser also includes a liquid distributor which includes a pair of tubes. Each of the tubes has a first substantially semi-circular part adapted to surround one half of the pole and a second substantially vertical part which is directly connected to the first part and which is in fluid communication with the holder through the bottom of it to receive the weed killer dispersed in the water from the holder. Each of the tubes may be pivoted relative to the holder through the second part thereof so as to be openable and closable for mounting and dismounting the dispenser on the pole. A spring is disposed between the tubes so as to bias them toward each other and thereby normally close them about the pole. The first part of each of the tubes has a plurality of spaced radially outwardly extending holes therein through which the weed killer dispensed in the water may flow downwardly along the pole to kill any weeds thereon.

4 Claims, 4 Drawing Figures

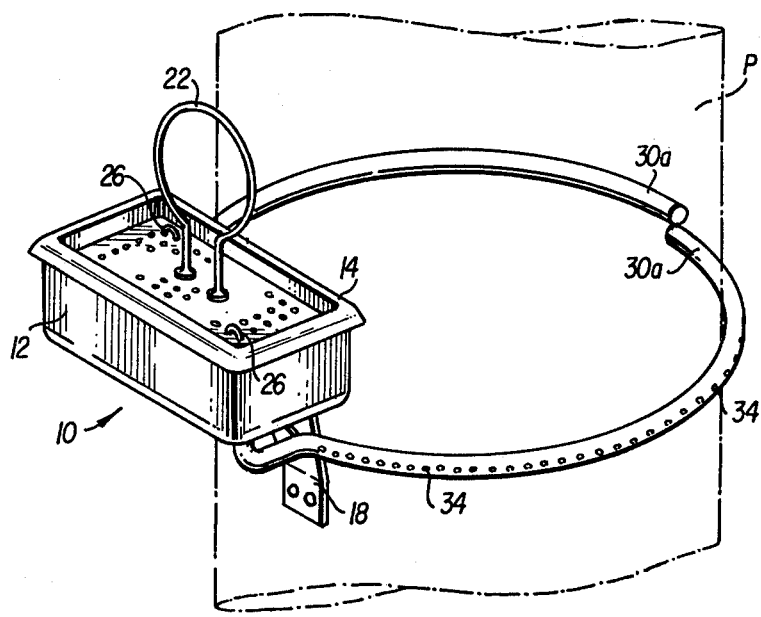
FIG. 1
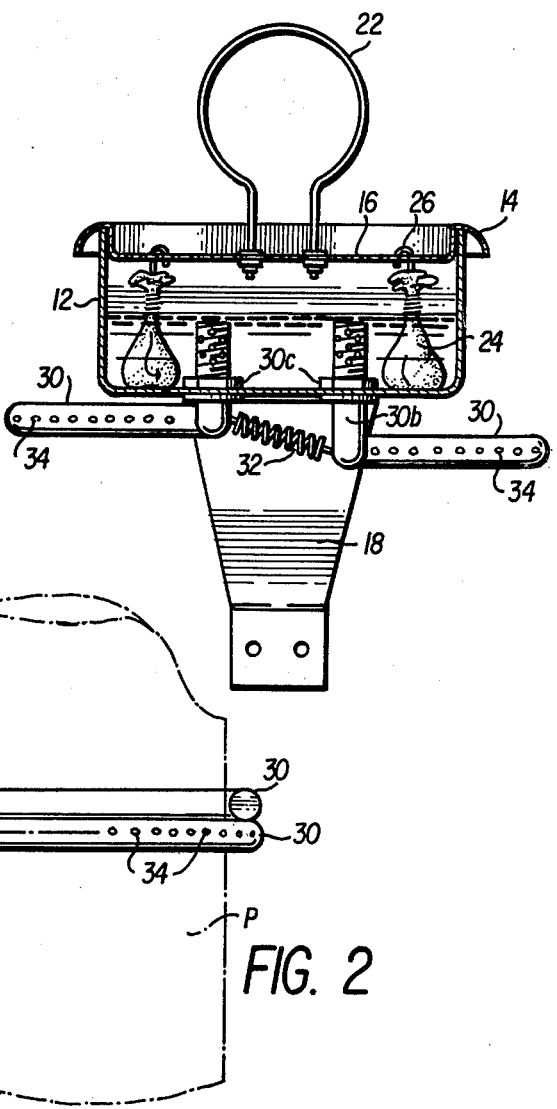
FIG. 3
FIG. 2

POLE MOUNTED WEED KILLER DISPENSER

FIELD OF THE INVENTION

This invention relates to a liquid dispenser and, more particularly, to a weed killer dispenser for killing any weeds which may be growing on a pole, such as a telephone or telegraph pole.

BACKGROUND OF THE INVENTION

As is well known, weeds and other vines commonly cling to and grow quite quickly on telephone and telegraph poles, particularly those in rural areas where the weeds and other vines cannot be cut regularly. Such growing weeds and vines can disrupt electrical or other communication services provided by those lines. In addition, the removal of such weeds and vines from the poles, particularly in rural areas, can be quite expensive, particularly if such removal is done manually.

SUMMARY OF THE INVENTION

An object of this invention is to provide a dispenser which will automatically dispense weed killer down along a pole such as a telephone or telegraph pole.

Another object of this invention is to provide a weed killer dispenser which is inexpensive to manufacture and easy to install on poles, such as telephone and telegraph poles.

A further object of this invention is to provide a weed killer dispenser which when dispersed in rain water can flow down along the pole to kill any weeds or vines thereon.

A further object of this invention is to provide a weed killer dispenser which requires minimal servicing.

The above objects and others are achieved by providing a weed killer dispenser which is adapted to be mounted on and disposed about a pole such as a telephone or telegraph pole. The dispenser includes a box-like holder for water and weed killer which is dispersible in the water. The holder has a recessed top which defines a water receiving perforated tray through which rain water may flow into the holder. The top is readily removable from the holder. Weed killer containers, such as porous nylon bags, are provided in the holder. The containers are connected to the top of the holder so as to be readily removable therewith from the holder and readily replaceable. The dispenser also includes a liquid distributor comprising a pair of tubes. Each of the tubes has a first substantially semi-circular part adapted to surround substantially one half of the pole and a second substantially vertical part connected to the first part. The second part is in direct fluid communication at one end thereof with the holder through the bottom thereof to receive weed killer dispersed in the water from the holder. Each of the tubes may be pivoted relative to the holder through the second part thereof so as to be openable and closable for mounting and dismounting the dispenser on the pole. A spring is provided between the two tubes for biasing them toward each other so as to normally close them about the pole. The first part of each of the tubes has a plurality of spaced radially outwardly extending holes therein through which the weed killer dispersed in the water may flow downwardly along the pole to kill any weeds or vines thereon.

BRIEF DESCRIPTION OF THE DRAWINGS

FIG. 1 is a perspective view of the invention mounted on a pole;

FIG. 2 is a side view of the invention;

FIG. 3 is an end view, partly in section, of the invention; and

DESCRIPTION OF THE PREFERRED EMBODIMENTS

Figure 4:
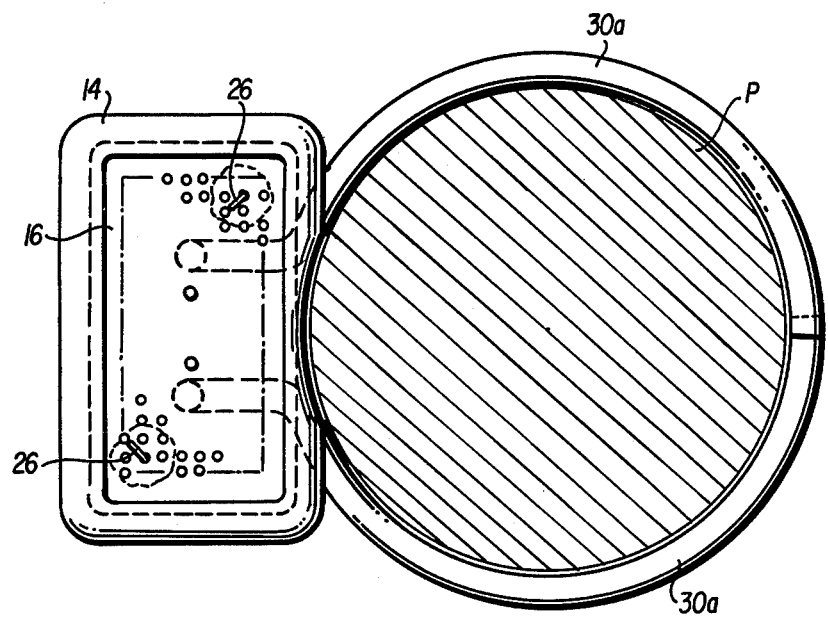
FIG. 4 is a plan view of the invention.

In FIG. 1 is shown a weed killer dispenser 10 mounted on a pole P. The dispenser includes a box-like holder 12 for water and weed killer which is dispersible in the water. The holder 12 includes a readily removable recessed top 14. The top 14 defines a water receiving perforated tray 16 through which rain water may flow into the holder 12. As is apparent from FIG. 3, the top 14 is readily removable from the holder 12.

The dispenser 10 may be mounted on the pole P through a bracket 18 which may be nailed at 20 to the pole. The upper end of the bracket 18 can be welded or otherwise fixedly secured to the bottom of the holder 12.

A hoop 22 is fixedly secured to the perforated tray 16, for example, by welding, or by nuts. The ring 22 is adapted to be engaged by a long manually movable pole from the ground to readily remove the hoop 22, top 16 and weed killer containers which will be described in detail hereinafter.

Disposed within the holder 12 are a plurality of weed killer containers 24, such as porous nylon bags. Wire hooks 26 are wound about and close the upper end of each of the bags. The hooks 26 hook over the perforations in the tray 16. As a result, the containers 24 are readily removable with the top 14 when the hook 22 is engaged by a pole from the ground. By this means, the weed killer in the bags 24 or the bags themselves can be readily changed when the weed killer in them is expended.

It is contemplated with this invention that any type of conventional vine or weed killer could be placed in the bags 24. For example, it is envisioned that a semi-soil sterilant or defoliaging agent such as BO-RID 10H (USDA Reg. No. 179-20) or other similar agents could be placed in the porous nylon bags 24. When contacted by the rain water, the weed killer is dispersed in the water and flows downwardly along the pole P to kill any weeds or vines growing on it. It is also contemplated in this invention that a water soluble killer could be placed in the bags 24.

The dispenser 10 also includes a pair of tubes 30. Each of the tubes includes a first substantially semi-circular part 30a which is adapted to surround substantially one half of the pole P. Each of the tubes also includes a second substantially vertical part 30b which is in direct fluid communication with the holder 12 through the bottom thereof. As is apparent from FIG. 2, each part 30b extends upwardly through the bottom and terminates in a perforated portion thereof. Obviously, the connection between the part 30b and the bottom of the holder 12 must be made fluid tight so that water in the holder 12 will not leak. Such fluid tight coupling can be affected by means of a seal ring or the like. As shown in FIG. 2, the upper end of each part 30b is externally threaded and a nut 30c is threadingly engaged with each part 30b to fixedly secure it to the holder 12. The nuts 30c are generally sufficient in themselves to prevent leakage from the holder 12 and sandwich the bottom of the holder 12 against enlargements on the parts 30b which abut the exterior of the bottom of the holder 12.

Upon disengagement of the nuts 30c from the holder 12, each of the tubes 30 may be pivoted relative to the holder 12 through the second part about the axis thereof so as to be openable and closeable about the pole for mounting and dismounting the dispenser on the pole. In order to hold the tubes 30 in their normally closed position about the pole, a spring 32 may be provided between them. One end of the spring 32 is fixedly connected to one of the tubes 32 and the other end is fixedly connected to the other tube 30. After the tubes are positioned about the pole P, the nuts 30c may be tightened against the bottom of the holder 12 to fixedly position the tubes 30.

The first parts 30a of each of the tubes 30 has a plurality of spaced radially outwardly extending holes therein through which the weed killer may flow downwardly along the pole to kill any weeds or vines thereon. The holes if desired could also or alternatively be directed downwardly or radially inwardly.

It should be apparent from the above that the weed killer dispenser may be readily mounted on a pole by simply securing the bracket 18, for example by nails 20, to the pole P. In use, water or other liquid may be initially placed in the holder 12 for dispensing down the pole. However, it is contemplated in this invention, that the holder 12 will receive rain water through the perforate tray 16. The weed killer in the containers 24 will become dispersible or soluble in the rain water and flow therewith through the tubes 30 and out through the holes 34 and down along the post to kill and weeds or other vines which may be growing thereon. When the weed killer in the containers 24 is expended, one can manually, by means of an extended pole, lift the hoop 22 which is connected to the top 14. By reason of the hooks 26, the containers 24 will be removed with the top 14 and lowered to the ground. At that time, a new supply of weed killer may be placed in the containers 24 or new containers 24 may replace the ones previously used. After the new weed killer is added into the containers 24 or when the containers 24 are replaced with new ones containing weed killer, the new weed killing material, secured to the top 24, can be remounted on the holder 12, again through the use of a pole extension engaging the hoop 22.

When the dispenser 10 is initially mounted on the pole, with the nuts 30c disengaged, the free ends of the tubes 30 can be spread apart against the bias of the spring 32 and then released for disposition about the post. The nuts 30c may then be engaged against the bottom of the holder 12 to secure the tubes 30 in position. In the event that it is desired to remove the dispenser 10 from the pole, the nails or other members 20 can be removed and the free ends of the tubes 30 can be spread apart, after the nuts 30c are engaged so that the dispenser 10 can be removed from the pole P.

It is envisioned that a liquid weed killer dispenser of the type described above may have the following specifications. The holder 12 may be 8½ inches long, 4 inches wide, and 5½ inches deep. The top 14 may extend downwardly into the holder 12 about ½ inch. The top 14 and container 12 may be made of a plastic, such as polyvinyl chloride, that will withstand temperatures in the range of −40° F. to 150° F. The holes in the perforate tray 16 are preferably 1/16 inch in diameter.

The tubes 30 may be constructed of a hard plastic, such as polyvinyl chloride, of ½ inch diameter. Such plastic again is provided to withstand temperatures in the range of from −40° F. to 150° F. The holes 34 in the tubes 30 may be preferably 1/16 inch in diameter and are equally spaced ½ inch apart along the first part 30a of the tubes 30. The holes in the upper end of the second part 30b of the tubes 30 may be 1/16 inch in diameter and successive rows are staggered as shown in FIG. 3. The rows are spaced vertically about 1 inch apart. Also, as noted above, the containers 24 are preferably made of nylon mesh.

Although the invention has been described above with reference to a specific embodiment, it will be evident to persons ordinarily skilled in the art that variations and modifications can be made to the invention without departing from the spirit and scope of the invention as defined by the claims.

What I claim is:

1. A weed killer dispenser adapted to be mounted on and disposed about a pole, said dispenser comprising:
   a box-like holder for water and water dispersible or water soluble weed killer, said holder having a recessed top which defines a water receiving perforated tray through which rain water may flow into the holder, said top being removable from said holder, weed killer containers in said holder, said containers being connected to said top so as to be removable therewith from said holder and replaceable; and
   a liquid distributor comprising a pair of tubes, one of said tubes having a first substantially semi-circular part adapted to surround substantially one-half of the pole, the other of said tubes having a first substantially semi-circular part adapted to surround substantially the other half of the pole, each of said tubes having a substantially vertical part directly connected to said first part thereof and being in direct fluid communication at one end thereof with said holder through the bottom thereof to receive weed killer in a liquid from the holder, each of said tubes being pivotable relative to said holder through the second part thereof so as to be openable and closable for mounting and dismounting the dispenser on the pole, the first parts of said tubes having a plurality of circumferentially spaced holes therein through which the weed killer may flow downwardly along the pole to kill any weeds or vines thereon.

2. A weed killer dispenser adapted to be mounted on and disposed about a pole, said dispenser comprising:
   a box-like holder for water and water dispersible or water soluble weed killer, said holder having a recessed top which defines a water receiving perforated tray through which rain water may flow into the holder, said top being removable from said holder, weed killer containers in said holder, said containers being connected to said top so as to be removable therewith from said holder and replaceable; and
   a liquid distributing conduit in fluid communication with said holder to receive liquid therefrom, said conduit being adapted to substantially surround the pole and having a plurality of spaced holes therein through which the weed killer may flow downwardly along the pole to kill any weeds or vines thereon.

3. A weed killer dispenser adapted to be mounted on and disposed about a pole, said dispenser comprising:
- a box-like holder for water and water dispersible or water soluble weed killer, said holder being open at the top to readily receive rain water; and
- a liquid distributor comprising a pair of tubes, one of said tubes having a first substantially semi-circular part adapted to surround substantially one-half of the pole, the other of said tubes having a first substantially semi-circular part adapted to surround substantially the other half of the pole, each of said tubes having a substantially vertical part directly connected to said first part thereof and being in direct fluid communication at one end thereof with said holder through the bottom thereof to receive weed killer in a liquid from the holder, each of said tubes being pivotable relative to said holder through the second part thereof so as to be openable and closable for mounting and dismounting the dispenser on the pole, the first parts of said tubes having a plurality of circumferentially spaced holes therein through which the weed killer may flow downwardly along the pole to kill any weeds or vines thereon.

4. A weed killer dispenser adapted to be mounted on and disposed about a pole, said dispenser comprising:
- a box-like holder for water and water dispersible or water soluble weed killer, said holder having a recessed top which defines a water receiving perforated tray through which rain water may flow into the holder, said top being removable from said holder; and
- a liquid distributor comprising a pair of tubes, one of said tubes having a first substantially semicircular part adapted to surround substantially one-half of the pole, the other of said tubes having a first substantially semi-circular part adapted to surround substantially the other half of the pole, each of said tubes having a substantially vertical part directly connected to said first part thereof and being in direct fluid communication at one end thereof with said holder to receive weed killer in a liquid from the holder, the first parts of said tubes having a plurality of circumferentially spaced holes therein through which the weed killer may flow downwardly along the pole to kill any weeds or vines thereon.

* * * * *